United States Patent [19]
Mori

[11] 4,428,031
[45] Jan. 24, 1984

[54] ILLUMINATION DEVICE

[76] Inventor: Kei Mori, 3-16-3-501, Kaminoge, Setagaya-ku, Tokyo, Japan

[21] Appl. No.: 335,625

[22] Filed: Dec. 30, 1981

[30] Foreign Application Priority Data

Jan. 4, 1981 [JP] Japan .................................. 56/240

[51] Int. Cl.³ .............................................. F21V 7/04
[52] U.S. Cl. ..................................... 362/32; 362/145; 362/268; 362/277; 362/282; 362/283; 362/331; 362/340
[58] Field of Search ................. 362/32, 145, 268, 277, 362/282, 283, 331, 340

[56] References Cited

U.S. PATENT DOCUMENTS 4,152,752 5/1979 Niemi .................................... 362/32
4,297,000 10/1981 Fries .................................... 362/32

*Primary Examiner*—Stephen J. Lechert, Jr.
*Attorney, Agent, or Firm*—Merchant, Gould, Smith, Edell, Welter & Schmidt

[57] ABSTRACT

An illumination device for illuminating the interior of a room comprising an optical wave guide for transmitting light rays and a convex Fresnel lens for refracting light rays emitted from an exit end of the optical wave guide. In order to obtain the most effective illumination in the room, consideration should be given to the degree of refraction, the range of illumination and the area, to be illuminated.

For this purpose, according to the construction of the present invention, the distance between the convex Fresnel lens and the exit end of the optical wave guide can be adjusted within a range not longer than the focal length of the convex Fresnel lens. In addition, the convex Fresnel lens is constructed so as to be inclinable with respect to the stationary portion of said device.

6 Claims, 3 Drawing Figures

ILLUMINATION DEVICE

The present invention relates to an improvement of an illumination device. More particularly, the present invention relates to a novel interior illumination device wherein light rays propagated through an optical wave guide are used as a light source for illumination.

Recently, much attention has been given to the utilization of sunlight energy, and there have been energetic developments and researches in various fields concerning the effective utilization of sunlight energy with a view to meeting the requirement of saving energy.

In such a case, it is obvious that the most effective means of utilization of sunlight energy is the direct utilization of such energy for illumination rather than converting it into other forms of energy, such as electricity or heat, thereby avoiding loss of energy due to the process of conversion.

With a view to utilizing sunbeams as such a light source for illumination, the applicant of the present invention has proposed an illumination device capable of transmitting sunbeams collected on the exterior of a house to a place where illumination is required, e.g. the interior of a room, by means of an optical wave guide.

With this device, however, sunbeams reflected at the boundary surface of the optical wave guide propagate along the boundary surface and then are emitted from the exit end of said optical wave guide. The diffusion angle of the sunbeams as they are emitted from the exit end of the optical wave guide depends upon the critical angle of incidence of the material forming the optical wave guide and is about 45° for conventional material used to form an optical wave guide.

When the sunbeams are emitted from said exit end of the optical wave guide for the purpose of illumination of the interior of a room, such illumination will take place in a spotlight fashion. Thus, it is not necessarily suitable to illuminate a wide area in the room with sunbeams. In addition, since the concentration of the light energy of sunbeams becomes comparatively high, it is quite dangerous to touch said exit end with, for example, the hands or a combustible item.

The present invention as claimed is intended to overcome the aforementioned disadvantages of prior techniques. It does so by the fact that when a room is illuminated by light rays propagated through the optical wave guide, said light rays emitted from the exit end of the optical wave guide may be effectively diffused so as to iluminate substantially the whole room or a specific item to be illuminated and eliminates the danger due to the concentration of the light energy.

One advantage of the present invention is that the distance between the convex Fresnel lens and the exit end of the optical wave guide can be adjusted to within a range not longer than the focal length of the convex Fresnel lens. Another advantage is that the convex Fresnel lens is constructed so as to be inclinable, thereby eliminating another disadvantage of prior techniques.

The invention will now be described in greater detail with reference to the attached drawings, which illustrate a non-limitative exemplary embodiment, in which:

FIGS. 1A and 1B are optical drawings illustrating the basic principles of the illumination device according to the present invention, respectively.

Figure 1A:
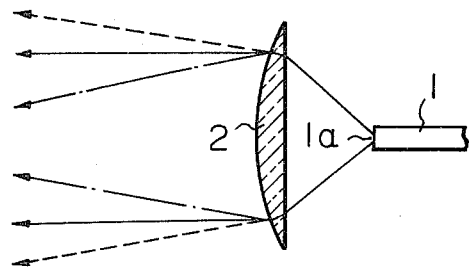
FIGS. 1A and 1B are schematic views showing the basic principles of an illumination device according to the present invention, respectively.
Figure 1B:
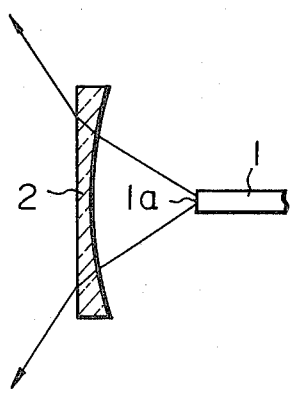

As shown in FIGS. 1A and 1B, reference numerals 1 and 2, respectively, denote an optical wave guide formed of, for example, a bundle of optical fibers covered with a protective sheath and a Fresnel lens formed of a light transparent material, such as plastic or glass.

As is well-known, on the end of the optical wave guide 1 (not shown), there is formed an optical apparatus for collecting sunbeams. Said collected sunbeams are propagated through the optical wave guide 1 and then are emitted from the exit end or end surface 1a of said optical wave guide.

These light rays (sunbeams) emitted from the exit end 1a of the optical wave guide 1 can be directly utilized to illuminate the interior of a room. As mentioned above, however, the diffusion angle of the emitted light rays is relatively small and illumination by such light rays will have a spotlight fashion. Moreover, it is dangerous to touch said exit end 1a with the hands or a combustible item. The above-mentioned disadvantages are significant shortcomings of prior techniques.

It is well-known that in prior arts attempts were made to overcome the above-mentioned disadvantages by providing a diffusing member through which light rays emitting from the exit end 1a of the optical wave guide 1 could be diffused and then utilized for illumination. However, such a diffusing member emphasizes the question of how light rays emitted from the exit end 1a of the optical wave guide 1 can effectively and uniformly be diffused over a wide area in a room, and the degree of diffusion, range of illumination and area to be illuminated etc. are not considered.

Referring to FIGS. 1A and 1B, the Fresnel lens 2 is placed opposite the exit end 1a of the optical wave guide 1. The axis of the Fresnel lens 2 may be inclined while simultaneously remaining aligned with the optical axis on the exit end 1a of the optical wave guide, and the distance between the Fresnel lens 2 and said exit end 1a is selectively adjustable by means of an adjusting means. Thus, according to the present invention, illumination in any desired direction can be obtained by inclining the axis of the Fresnel lens.

As can be seen in the drawings, the Fresnel lens 2 in FIG. 1A is formed in the shape of a convex lens. Therefore, when the distance between the Fresnel lens 2 and the exit end 1a is equal to the focal length of the Fresnel lens, the course of the light rays refracted through the Fresnel lens is indicated by the solid lines. When the distance between the Fresnel lens 2 and the exit end 1a is shorter or longer than the focal length of said Fresnel lens, the course of the light rays refracted through the Fresnel lens will be as indicated by the broken or dot and dash lines, respectively. Contrary to the above, the Fresnel lens 2 in FIG. 1B is formed in the shape of a concave lens. Under any condition, the course of the light rays will be as indicated by the solid lines with a diverging angle.

Therefore, in FIG. 1A, if the convex Fresnel lens 2 is approached to the exit end 1a, the range of illumination illuminated by said light rays becomes wider, and vice versa. However, it should be noted that when the distance between the convex Fresnel lens 2 and the exit end 1a of the optical wave guide 1 is longer than the focal length of said lens, the light rays refracted through the convex Fresnel lens 2 will converge, resulting in an unfaborable condition. Therefore, the distance between the convex Fresnel lens 2 and the exit end 1a should not be longer than the focal length of said lens 2.

Figure 2:
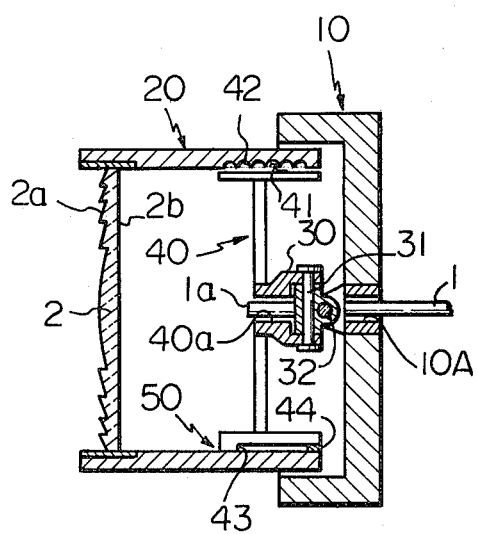
FIG. 2 is a cross-sectional view showing an embodiment of an illumination device according to the present invention.

FIG. 2 is a schematic constructional view showing embodiment according to the present invention. Referring to FIG. 2, an illumination device according to the present invention includes a base member 10 for introducing the optical wave guide 1, a cylinder member 20 having a holding member 40 with a joint member 30 and having a convex Fresnel lens 2 therein. The holding member 40 faces the base member 10 and is connected to the base member 10 by means of the joint member 30.

The optical wave guide 1 is introduced through an aperture 10a formed substantially at the center of the base member 10; then the exit end 1a of the optical wave guide 1 is attached to an aperture 40a also formed at the center of the holding member 40. Said attaching of the exit end 1a may be effected by any suitable fastening means such as adhesives, soldering or the like in such a manner that the axis of the Fresnel lens 2 is brought into alignment with the optical axis of the exit end 1a. The other end of the optical wave guide 1 may be connected to a sunbeam collecting apparatus (not shown) installed at a suitable outdoor location. Thus, light rays emitted from the exit end 1a of the optical wave guide 1 can be refracted toward the interior of the room by means of the Fresnel lens 2.

The cylinder member 20 is mounted at an incline on the base member 10 by means of a well-known universal joint 30, which includes, for example, two pivot pins 31 and 32 arranged perpendicularly to each other, while simultaneously maintaining said optical relation between the Fresnel lens 2 and the exit end 1a of the optical wave guide.

For the purpose of adjusting the distance between the convex Fresnel lens 2 and the exit end 1a of the optical wave guide, a curved spring member 41 is positioned on the outer periphery of the holding member 40, and a series of notches 42 is formed along the direction of the axis on the inner periphery of the cylinder member 20. Therefore, by snappingly engaging the curved spring member 41 with one of the series of notches 42, one by one, the adjusting of the above distance can easily be accomplished.

In order to restrict the displacing distance of the cylinder member 20 from the holding member 40, a hook 43 and a stop 44 are provided. The hook 43 is formed at the outer periphery of the holding member 40, and the stop 44 is formed at the inner periphery of the cylinder member 20 in and area adjacent to the base member 10. During the unconscious adjusting of the distance between the convex Fresnel lens 2 and the exit end 1a, said hook 43 will abut said stop 44 and prevent said distance from becoming longer than the focal length of the convex Fresnel lens 2.

The above described structure constitutes a suitable means for displacing the cylinder member with respect to the holding member and thereby is an example of a suitable means for adjusting the cylinder member with respect to the holding member.

In the case of the concave Fresnel lens, since light rays refracted by said lens always diverge the above restriction is unnecessary.

The convex Fresnel lens used in the illumination device has two planes, i.e. a convex plane 2a and a flat plane 2b. The illuminating condition of light rays passing from the convex plane 2a into the flat plane 2b is fairly different from that of light rays passing from the flat plane 2b into the convex plane 2a. As shown in FIG. 2, light rays entering from the flat plane 2b will be refracted out of the convex plane 2a in substantially the same manner as in the case of the conventional convex lens. However, interference fringes created on such refracted light rays are relatively indistinct. On the contrary, when the plane of incidence is reversed and light rays enter from the convex plane 2a, interference fringes on refracted light rays are relatively distinct.

Whether to use light rays with distinct interference fringes or to use light rays with indistinct interference fringes to illuminate in a room depends upon the type of illumination desired. According to the present invention, the convex Fresnel lens 2 is mounted on the cylinder member 20 in such a manner that said Fresnel lens may be turned inside out so as to select the desired direction of illumination.

As will readily be understood from the foregoing description, according to the present invention, by inclining the cylinder member 20 with respect to the base member 10, light rays emitted from the exit end 1a of the optical wave guide 1 can be projected in any direction desired. Also, by approaching the Fresnel lens 2 to the exit end 1a of the optical wave guide 1, the extent of light rays projected from the Fresnel lens 2 is increased; conversely, by alienating the Fresnel lens 2 from said exit end 1a, the extent of light rays projected from the Fresnel lens 2 is decreased. Consequently, any area may be illuminated with optional illumination as desired.

Because the Fresnel lens 2 is mounted on the cylinder member 20 in such a manner that said Fresnel lens may be interchangeably turned inside out, interference fringes creacted on refracted light rays projected from the Fresnel lens may be optionally determined as being distinct or indistinct.

Furthermore, according to the present invention, a Fresnel lens having a desired shape and size can be manufactured from the base Fresnel lens. For example, supposing that the base Fresnel lens has been formed in the shape of a circular disk having a diameter of 30 cm, a circular shaped Fresnel lens having any diameter of less than 30 cm can be obtained by machining said base Fresnel lens, and a square or hexagon shaped Fresnel lens can be obtained from the base Fresnel lens. It should be noted that, in such a case, the size of the square or hexagon Fresnel lens obtained is smaller than the imaginal square or hexagon which inscribe the circle having a diameter of 30 cm.

Therefore, the Fresnel lens 2 shown in FIGS. 1A, 1B and 2 can readily be manufactured having the desired size and shape.

The invention has been described in detail with particular reference to the preferred embodiment thereof, but it will be understood that reasonable variations and modifications are possible without departing from the spirit and basic scope of the invention.

I claim:

1. An illumination device for illuminating the interior of a room with an optical wave guide which transmits light rays from a light source therethrough and a convex Fresnel lens for refracting light rays emitted from an exit end of said optical wave guide toward the interior of the room, said illumination device comprising:
    a base member for an optical wave guide having a first aperture for introducing therein said optical wave guide serving as the light source;

a cylinder member facing said base member and having a holding member with a joint member and having said convex Fresnel lens therein, said holding member positioned near said base member, and said convex Fresnel lens being positioned apart from said base member, said cylinder member, holding member and convex Fresnel lens being aligned with each other; and said holding member having a second aperture to which is attached said exit end of the optical wave guide and which is connected to said base member by means of said joint member, said convex Fresnel lens being spaced from and aligned with said exit end of the optical wave guide so as to refract light rays emitted from said exit end, and said cylinder member includes means for displacing said cylinder member with respect to said holding member so that the distance between said end portion of the optical wave guide and said Fresnel lens is displacable within a range not longer than the focal length of said convex Fresnel lens.

2. An illumination device as set forth in claim 1, wherein said cylinder member is inclinable with respect to said base member.

3. An illumination device as set forth in claim 1 or 2, wherein said convex Fresnel lens can be reversibly interchangeably mounted on said cylinder member.

4. An illumination device for illuminating the interior of a room with an optical wave guide which transmits light rays from a light source therethrough and a concave Fresnel lens for refracting light rays emitting from an exit end of said optical wave guide toward the interior of a room, said illumination device comprising:

a base member for an optical wave guide having a first aperture for introducing therein said optical wave guide serving as the light source;

a cylinder member facing said base member and having a holding member with a joint member and having said concave Fresnel lens therein, said holding member positioned near said base member and said concave Fresnel lens being positioned apart from said base member, said cylindrical member, holding member and concave Fresnel lens being aligned with each other; and said holding member having a second aperture to which is attached said exit end of the optical wave guide and connected to said base member by means of said joint member, said concave Fresnel lens being spaced from and aligned with said exit end of the optical wave guide so as to diverge light rays emitted from said exit end, and said cylinder member includes means for adjusting said cylinder member with respect to said holding member so that the divergency of light rays refracted through the concave Fresnel lens is adjustable.

5. An illumination device as set forth in claim 4, wherein said cylinder member is inclinable with respect to said base member.

6. An illumination device as set forth in claim 4 or 5, wherein said concave Fresnel lens can be reversibly interchangeably mounted on said cylinder member.

* * * * *